United States Patent [19]

Sigmund

[11] 4,375,120

[45] Mar. 1, 1983

[54] METHOD AND APPARATUS FOR TIGHTENING THREADED FASTENER ASSEMBLIES

[75] Inventor: Jerry A. Sigmund, Merion Station, Pa.

[73] Assignee: SPS Technologies, Inc., Jenkintown, Pa.

[21] Appl. No.: 137,947

[22] Filed: Apr. 7, 1980

[51] Int. Cl.[3] ........................ B23Q 17/00; B23P 19/04

[52] U.S. Cl. ........................................ 29/407; 29/240; 73/761; 73/862.23; 173/12; 364/505; 364/508

[58] Field of Search .................... 29/240, 407; 73/139, 73/761; 173/12; 364/505, 507, 468

[56] References Cited

U.S. PATENT DOCUMENTS

| | | | |
|---|---|---|---|
| 3,982,419 | 9/1976 | Boys . | |
| 4,000,782 | 1/1977 | Finkelston | 73/139 X |
| 4,104,778 | 8/1978 | Vliet . | |
| 4,104,780 | 8/1978 | Sigmund . | |
| 4,163,310 | 8/1979 | Sigmund | 29/407 |
| 4,179,786 | 12/1979 | Eshghy | 29/240 X |

*Primary Examiner*—Francis S. Husar
*Assistant Examiner*—C. J. Arbes
*Attorney, Agent, or Firm*—Aaron Nerenberg

[57] ABSTRACT

Apparatus and method for tightening assemblies held together by threaded fasteners. The desired tightened condition is achieved by calculating the tightening torque required to induce a desired preload in the threaded fastener and comparing this calculated tightening torque with the torque being imparted to the fastener to tighten the assembly. When the two torques are equal, the torque imparted to the fastener is stopped. The tightening torque is calculated by identifying properly the relationship between the torque-rotation curve through which the assembly is taken as it is being tightened and the preload-rotation curve for the assembly.

9 Claims, 3 Drawing Figures

METHOD AND APPARATUS FOR TIGHTENING THREADED FASTENER ASSEMBLIES

DESCRIPTION

1. Technical Field

The present invention relates, in general, to the tightening of assemblies and, in particular, to an apparatus and method for tightening assemblies which are held together by threaded fasteners.

2. Background Art

The precise clamping load of a threaded fastener is extremely important in determining whether or not a joint, including the fastener, will fail in service. Consequently, threaded fasteners should be installed in a controlled manner, whereby the clamping load required to maintain the integrity of the assembly is achieved.

One common technique for controlling the tightening of threaded fasteners is to use torque control apparatus by which a specific predetermined torque is applied in an attempt to attain a desired preload for particular thread and frictional conditions. Such an approach has the disadvantage that there may be variations in the torque/tension relationship from one tightening cycle to the next for the same assembly or same type of assembly due to different friction conditions from joint to joint, whereby clamping loads varying as much as ±30% may be produced for a given applied torque.

Another known technique which is not dependent upon frictional conditions involves measuring the elongation of the fastener as the assembly is tightened. While this approach is capable of developing the accuracy required to achieve the desired clamping load, as a practical matter, in most cases direct measurement of elongation is either impossible or commercially unfeasible.

Yet another tightening technique which has been employed in the past in installing threaded fasteners is based on angle control. Given an estimate of the elongation required to achieve a desired clamping load, the threaded fastener is turned through a precise angle of tightening which will produce the necessary elongation. The disadvantage of this approach results from the difficulty in identifying the initiation point for the measurement of rotation of the fastener to produce the desired clamping load. U.S. Pat. Nos. 4,104,778 and 4,104,780 are directed to this technique and address the problem of identifying the point for initiating the measurement of rotation.

U.S. Pat. No. 3,982,419 is directed to an apparatus and method which involve tightening threaded fasteners into the yield region of the fasteners. Under such conditions, the disadvantages of the other techniques described above are avoided and the integrity of the assembly is greatly enhanced. There are, however, applications where the threaded fastener preferably is tightened to some point within its elastic range. For example, in the installation of certain high strength bolts, tightening to some clamping load below the elastic limit of the fastener will provide the desired conditions.

DISCLOSURE OF INVENTION

Accordingly, it is an object of the present invention to provide a new and improved apparatus and method for tightening a joint including a threaded fastener.

It is another object of the present invention to provide an apparatus and method for tightening a joint including a threaded fastener which involve tightening the fastener to a desired clamping load within its elastic range.

It is yet another object of the present invention to provide an apparatus and method for tightening a joint including a threaded fastener which are relatively accurate and efficient, and require a minimum amount of prior knowledge about the joint.

A desired tightened condition of an assembly is achieved, in accordance with the present invention, by imparting a computed amount of torque for the particular fastener being installed to induce the desired preload in the fastener. This result is obtained by utilizing the relationship between the actual torque-rotation curve for the assembly being tightened and the predetermined preload-rotation curve for the assembly.

In accordance with the apparatus and method of the present invention, an assembly, including a threaded fastener, is tightened by imparting torque and rotation to the fastener, whereby the assembly is taken through a torque-rotation curve having a non-linear tightening portion followed by a substantially linear tightening portion. The desired preload which is to be induced in the fastener when the assembly has been tightened to the desired degree and a selected preload within the substantially linear tightening portion and smaller than the desired preload are established in advance of the tightening of the assembly. The tension rate of the assembly also is established in advance of the tightening of the assembly. As torque and rotation are imparted to the fastener, the gradient of the torque-rotation curve is calculated. A tightening torque to be imparted to the fastener to induce the desired preload is calculated by adding to the torque which induces the selected preload a second torque determined by multiplying the gradient of the substantially linear tightening portion with the difference between the desired preload to be induced in the fastener and the selected preload and dividing this product by the tension rate of the assembly. The stoppage of drive to the fastener is effected by comparing the tightening torque with the amount of torque actually being imparted to the fastener to tighten the assembly and developing an indication when the drive has imparted a torque to the fastener equal to the tightening torque.

BRIEF DESCRIPTION OF DRAWINGS

Referring to the drawings.

BEST MODE OF CARRYING OUT THE INVENTION

Figure 1:
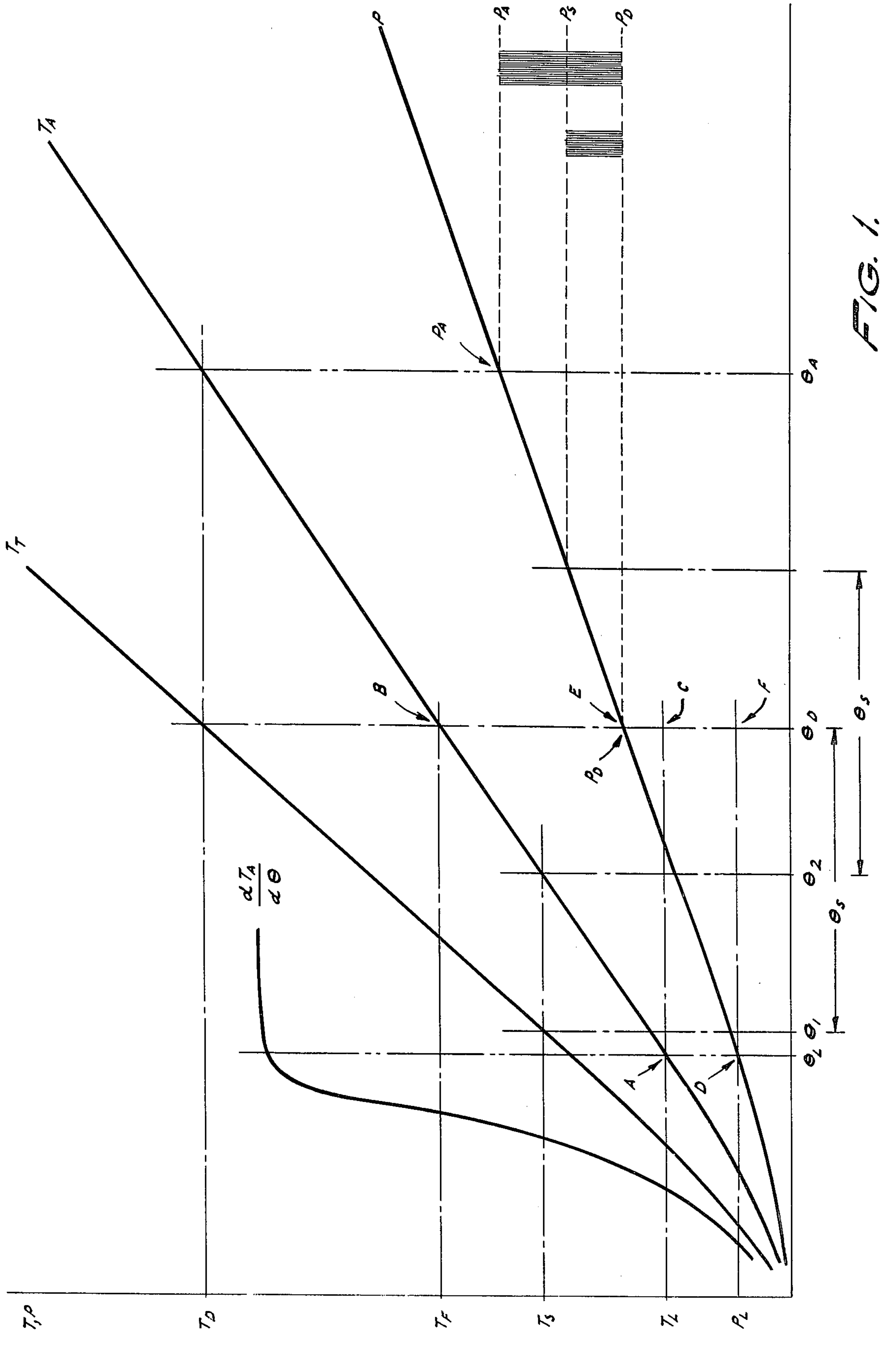
FIG. 1 shows the idealized tightening curves associated with a typical assembly held together by a threaded fastener and the manner in which a desired, predetermined preload is induced in the fastener, in accordance with the present invention, to achieve a properly tightened condition for the assembly.

Referring to FIG. 1, the tightening curves which are illustrated are idealized in that they are shown to have smooth and linear portions, when, in fact, under practical conditions they are somewhat irregular due to electrical and mechanical noise and the linear portions typically are, at best, substantially linear, rather than truly linear. The principles of the present invention may be most readily understood by dealing with idealized curves. Although the differences between ideal and practical conditions are well understood by those skilled in the art, the description of the invention will make reference to the manner in which certain practical effects may be handled.

The curve identified by P is a preload-rotation curve and $P_D$ represents, for example, a desired, predetermined preload which is to be induced in the threaded fastener when the assembly has been tightened to the desired value. This curve may be derived either by calculation or experimentation. Normally, curve P is derived by actual measurements of preload induced in a fastener in a sample joint assembly including a strain-gaged bolt, as it is being tightened. Given the physical characteristics of the assembly, including the threaded fastener, curve P may also be derived from the equation which defines the preload versus angle relationship, $P=K\theta$, for the linear portion of the curve.

As an illustration of the tightening of a typical joint, the curve identified by $T_T$ is the theoretical torque-rotation curve for the assembly. This curve also may be derived by calculation or experimentation. Because there is a family of torque-rotation curves for a given assembly due to friction variations, curve $T_T$, when derived experimentally, is developed by taking the average of several such curves for a particular type of assembly.

Curve $T_A$ is a typical actual torque-rotation curve for the assembly. This curve is derived "on-the-fly" as the particular assembly is being tightened by sensing the torque and rotation imparted to the threaded fastener to tighten the assembly.

Curves $T_A$ and $T_T$ are illustrated as being different to reflect the likelihood of different friction conditions from one tightening cycle to another of the same assembly, which will result in the generation of different torque-rotation curves for different tightening cycles of the same assembly. This situation illustrates the disadvantage of torque control apparatus mentioned previously. As an illustration of this disadvantage, if the tightening equipment is set to shut off at a given torque level $T_D$, in order to achieve, according to curves $T_T$ and P, the desired period $P_D$ and, in fact, the actual torque-rotation curve for the tightening cycle is $T_A$, the fastener rotation will be taken to $\eta_A$ rather than the desired $\theta_D$. This will result in an induced preload $P_A$ rather than the desired preload $P_D$. The shaded area between $P_A$ and $P_D$ indicates the variation in induced loads in the threaded fastener for a variation in torque-rotation curves between $T_T$ and $T_A$.

Angle control tightening, also mentioned previously, is based on that portion of the preload-rotation curve where the two are linearly related. Knowing this relationship and knowing when it starts, a desired, predetermined preload may be induced in the threaded fastener by imparting a controlled amount of rotation to the fastener. The problem, in the past, has been to determine the starting point for imparting this controlled amount of rotation. The prevalent practice is to sense a prescribed torque level and impart the fixed amount of rotation to the fastener starting at that point. For a prescribed torque level of $T_S$, for example, the respective starting points for imparting a tightening angle of $\theta_S$ are spaced apart by an angle between $\eta_1$ and $\eta_2$ which is equal to the spread on the $T_T$ and $T_A$ curves at the $T_S$ torque level. FIG. 1 shows the variation in induced loads in the shaded area between $P_D$ and $P_S$ when the same amount of rotation $\theta_S$ is imparted to a threaded fastener but the starting points vary between $\theta_1$ and $\theta_2$. As previously mentioned, U.S. Pat. Nos. 4,104,778 and 4,104,780 eliminate this potential variation somewhat by identifying a proper point for initiation of the measurement of rotation. This is accomplished by circuitry which senses the onset of the linear portion of the curve and starts the measurement of rotation from that point.

In accordance with the present invention, the desired predetermined preload $P_D$ to be induced in the threaded fastener is achieved as follows. A preload $P_L$ and the torque $T_L$ which induces preload $P_L$ are selected either by calculation or experimentation. Preload $P_L$ is selected to be within the substantially linear tightening portion and smaller than the desired preload $P_D$. By specifying that preload $P_L$ is within the substantially linear tightening portion, it is intended that preload $P_L$ may be the preload at the onset of the substantially linear tightening portion or a preload after the onset of the substantially linear tightening portion. The present invention will be described initially with preload $P_L$ and the corresponding torque $T_L$ which induces preload $P_L$ selected at the onset of the substantially linear tightening portions of the preload-rotation and torque-rotation curves, respectively. As such, preload $P_L$ is independent of friction.

After preload $P_L$ is selected, the slope of the linear portion of the preload-rotation curve is derived either by calculation or experimentation. This slope represents the tension rate TR of the assembly and may be determined from the following relationship:

$$TR = \frac{P_E - P_L}{\theta_E - \theta_L} \tag{1}$$

Where $P_L$ is the induced load when the preload-rotation curve becomes linear $\theta_L$ is the angle at which the preload-rotation curve becomes linear $P_E$ is the induced load at the elastic limit of the fastener $\theta_E$ is the angle at the elastic limit of the fastener The desired, predetermined preload $P_D$ is related to the tension rate of the assembly as follows:

$$TR = \frac{P_D - P_L}{\theta_D - \theta_L} \tag{2}$$

Where $P_L$ and $\theta_L$ are as defined above in connection with Equation (1)

$\theta_D$ is the angle at which the desired, predetermined preload is developed The triangle in FIG. 1, defined by points D, E, and F, identifies the relationship set forth in Equation (2).

Assuming that the assembly being tightened exhibits generally linear torque-rotation and preload-rotation relationships, torque and induced load are related according to the following general equation:

$$T_A = C_1 P d \tag{3}$$

Where $T_A$ is the torque imparted to the fastener $C_1$ is a factor representative of the coefficient of friction for the assembly and the geometry of the fastener P is the induced load in the fastener d is the pitch diameter of the fastener It is to be understood that Equation (3) is a simplification of the longer equation relating torque and induced load in a joint:

$$T = Pd\left(\frac{1}{2}\,\frac{1+\pi f d \sec\beta}{\pi d - fl \sec\beta} + .625 f_c\right)$$

This equation is discussed, for example, in "Machine Design" by J. E. Shigley, McGraw-Hill Book Company (1956). The bracketed terms represent the coefficient of friction factor for a joint and are combined into a value "$C_1$" in Equation (3). This simplification has been found to provide acceptable accuracy.

Transposing Equation (2):

$$P_D - P_L = (TR)(\theta_D - \theta_L) \quad (4)$$

and substituting $P_D$ in Equation (4) in Equation (3):

$$T_A = C_1 d(TR)(\theta_D - \theta_L) \quad (5)$$

Differentiating Equation (5) :

$$\frac{dT_A}{d\theta} = C_1 d(TR) \quad (6)$$

When operating in the substantially linear tightening portion of curve $T_A$, $(dT_A/d\theta)$ is substantially constant.

$$\frac{dT_A}{d\theta} = M \quad (7)$$

Where

M is the slope of the torque-rotation curve $T_A$

Substituting in Equation (6) and transposing this Equation:

$$C_1 = \frac{M}{d(TR)} \quad (8)$$

Substituting for $C_1$ in Equation (3):

$$T_A = \frac{MP}{TR} \quad (9)$$

The value of M may be determined "on-the-fly" as the fastener is driven and the assembly is tightened by comparing the change in torque imparted to the fastener over a specified rotation angle imparted to the fastener. The onset of the substantially linear tightening portion of curve $T_A$ may be detected by sensing the torque and rotation imparted to the threaded fastener, developing an indication of the gradient of the actual torque-rotation curve and determining when the gradient is constant. The gradient curve $dT_A/d\theta$, as shown in FIG. 1, has a changing value during the non-linear tightening portion of the actual torque-rotation curve $T_A$ and a substantially constant value during the substantially linear tightening portion of the torque-rotation curve. By sensing the onset of the substantially constant value of the gradient curve $(dT_A/d\theta)$, the onset of linearity of the preload-rotation curve P is determined and the value of the gradient M at that time is established.

Equation (7) may be expressed as follows:

$$M = \frac{T_F - T_L}{\theta_D - \theta_L} \quad (10)$$

Where $\theta_D$ and $\theta_L$ are as defined above in connection with Equation (1)

$T_F$ is the torque on curve $T_A$ at which prelaod $P_D$ is induced in the fastener $T_L$ is the torque at the onset of the substantially linear tightening portion of curve $T_A$ The triangle in FIG. 1, defined by points A, B and C, identifies the relationship set forth in Equation (10).

By solving for $(\theta_D - \theta_L)$ in Equations (2) and (10) and then equating the two, the following relationship is established:

$$\frac{P_D - P_L}{TR} = \frac{T_F - T_L}{M} \quad (11)$$

Solving for $T_F$:

$$T_F = \frac{M(P_D - P_L)}{TR} + T_L \quad (12)$$

The relationships set forth in Equations (11) and (12) may be explained graphically with respect to FIG. 1 by making reference to the two triangles defined by points A, B and C and points D, E and F. Since the two triangles have the same base, namely the angle $\theta_D - \theta_L$, the two altitudes $T_F$-$T_L$ and $P_D$-$P_L$ are related by the slopes of the triangles, namely, M determined "on-the-fly" and TR calculated in advance of the tightening operation.

Figure 2:
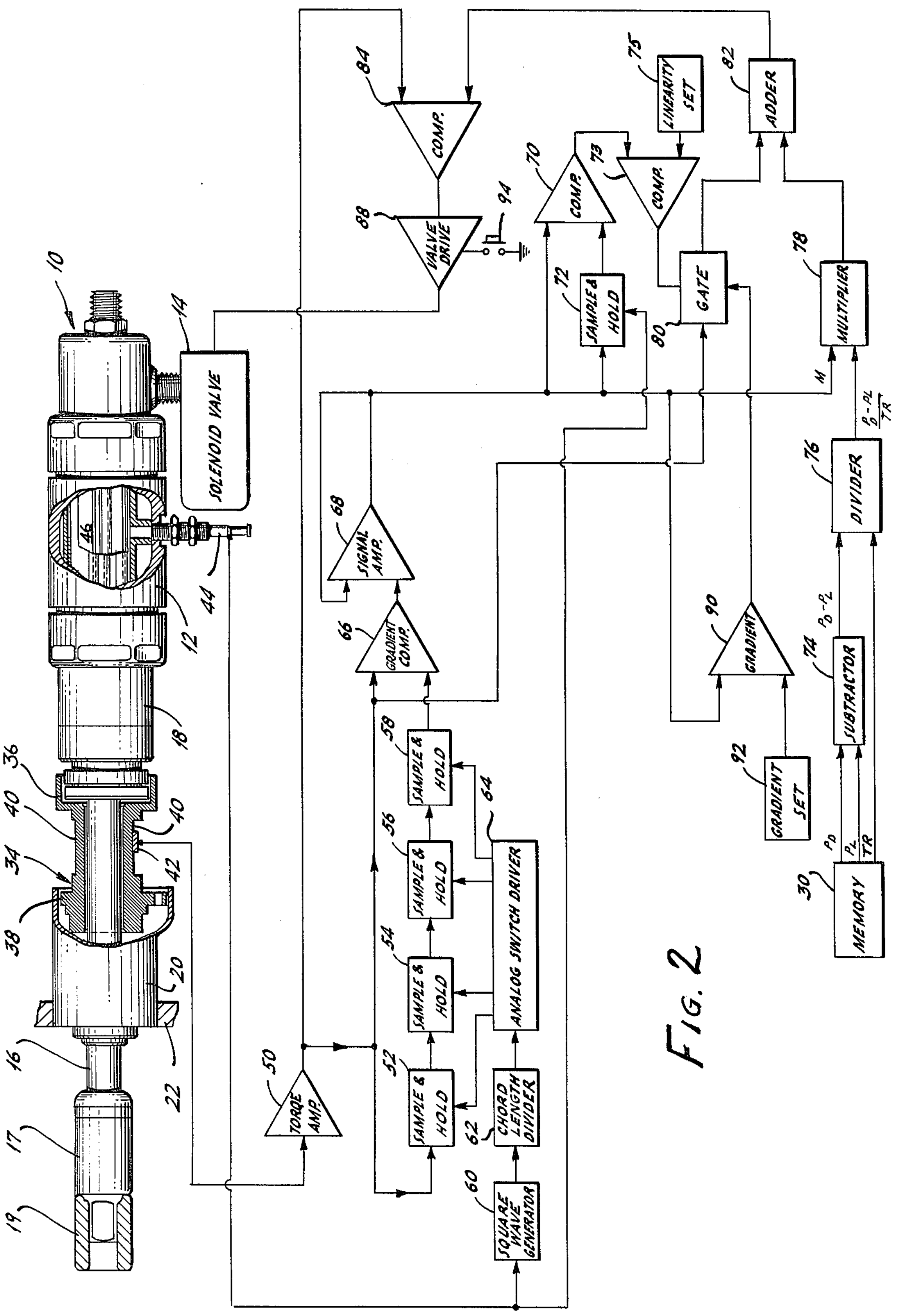
FIG. 2 shows one preferred embodiment of tightening apparatus constructed in accordance with the present invention.

FIG. 2 is a diagram of a preferred embodiment of tightening apparatus constucted in accordance with the present invention. This apparatus includes driving means for imparting torque and rotation to a fastener to tighten an assembly held together by the fastener. The driving means may be a wrench 10, having an air motor 12, the operation of which is controlled by a suitable solenoid valve 14, and which drives an output shaft 16 through a speed-reducing gear box 18 so that the output shaft does not rotate at the same high speed of the motor. Output shaft 16 carries an adapter 17 for attachment with a bit driver 19 and is mounted in a suitable rotary bearing assembly 20 facilitatng rotation of and taking up any bending stresses in the output shaft. Bearing assembly 20 may be mounted on a rigid frame 22, but use of the frame is not necessary for the practice of the invention. At this point it should be noted that while motor 12 has been described as an air motor, it may be of any suitable type for example, electric, hydraulic or any combination of pneumatic, electric or hydraulic. It should also be noted that the apparatus thus far described is generally conventional and need not be explained in greater detail.

The FIG. 2 apparatus also includes means for supplying:

(1) first preload signal representative of a desired preload ($P_D$) which is to be induced in the fastener when the assembly being tightened by the driving means has been tightened to a desired degree;

(2) a second preload signal representative of the preload ($P_L$) at the onset of the substantially linear tightening portion of curve $T_A$; and (3) a tension rate signal representative of the tension rate (TR) of the assembly being tightened. Such means may include a memory system 30 in which the three inputs are stored. Memory system 30 may be three conventional potentiometers which are set to represent the two preloads and the tension rate.

The tightening apparatus further includes torque sensing means responsive to the drive means for developing a torque signal representative of the torque imparted to the threaded fastener. Such means may include a torque cell 34 located between gear box 18 and bearing assembly 20. Torque cell 34 develops a signal representative of the instantaneous torque being imparted to the fastener. Torque cell 34 includes a first mounting base 36 securing the cell to gear box 18 and a second mounting base 38 securing it to bearing assembly 20. Extending axially of the wrench between mounting bases 36 and 38 are a plurality of strut members 40 which are somewhat deformable, that is, they are relatively rigid members capable of twisting somewhat about the axis of the wrench. When wrench 10 is operative to tighten a fastener, the reaction torque action thereon causes strut members 40 to twist about the axis of the wrench, the amount of twisting being proportional to the reaction torque which, of course, is equal to and opposite the torque being applied to the fastener. Each strut member 40 carries a strain gauge 42 which is connected to a Wheatstone bridge circuit (not shown) to develop an electric signal representative of the instantaneous torque being applied to the fastener. It should be noted that instead of strain gauges, contacting or proximity displacement gauges could be used to develop the electric signal representative of the torque being imparted to the fastener. In addition, the exact form of the torque cell 34 may vary somewhat. For example, struts 40 may be replaced by a somewhat deformable cylindrical member, if desired.

The tightening apparatus further includes angle sensing means responsive to the driving means for developing a first angle signal representative of the rotation imparted to the threaded fastener. Such means may include a proximity probe 44 mounted through the housing of motor 12 adjacent to and radially spaced from rotary vanes 46 in the motor. Proximity probe 44 may be in the form of an induction coil which develops an electric signal when metal passes through its magnetic field. Thus, as vanes 46 rotate when the fastener is being tightened, signals are provided by proximity probe 44 which represent fixed increments of rotation of the fastener. The size of the increments depends on the number of vanes 46 in motor 12 and the gear ratio of gear box 18. It should be understood that proximity probe 44 may be arranged to cooperate with one of the gears in gear box 18 in a similar manner.

Also included in the tightening apparatus of FIG. 2 are means responsive to the torque signal and the first angle signal for developing a gradient signal representative of the gradient of the torque-rotation curve $T_A$ for the assembly being tightened and a gate signal at the onset of the substantially linear tightening portion of the torque-rotation curve. In particular, the output signal from torque cell 34, representative of the instantaneous torque being imparted to the fastener, is supplied to a torque amplifier 50 which amplifies the torque signal to a level at which it is compatible with the rest of the system. From amplifier 50, the torque signal is fed through shift register means which comprise a series of charge coupled devices in the form of sample and hold circuits 52, 54, 56 and 58. The shift register means are clocked by signals representative of fixed angular increments of rotation of the threaded fastener. Specifically, signals from proximity probe 44, which are in the form of spike shaped pulses, are fed to a square wave generator 60 which shapes the signals and feeds the shaped signals through a chord length divider 62 to an analog switch driver 64 which sequentially clocks sample and hold circuits 52, 54, 56 and 58. Chord length divider 62 is a suitable divider circuit which electronically divides the pulses from square wave generator 60 by one, two, four, eight, sixteen or thirty-two so that every pulse, or every second pulse, or every fourth pulse, etc. is used to clock the shift register.

Analog switch driver 64, although not necessary, assures that each sample and hold circuit has discharged its stored signal before receiving a new signal. Accordingly, analog switch driver 64 sequentially clocks the sample and hold circuits first clocking circuit 52, then circuit 54, then circuit 56, and finally circuit 58. Thus, sample and hold circuit 58 has discharged its stored signal prior to receiving a new signal from sample and hold circuit 56 and likewise for the remaining sample and hold circuits. The output from sample and hold circuits 58 is representative of torque a fixed increment of rotation prior to that particular instant and is fed to a gradient comparator 66 in the form of a conventional differential amplifier which also receives an input signal, representative of the instantaneous torque being applied to the fastener, directly from torque amplifier 50. Gradient comparator 66 subtracts its two input signals and develops an output signal representative of the instantaneous torque gradient of torque-rotation curve $T_A$. In particular, the two inputs to comparator 66 are samples of the torque signal taken at different rotational positions of the fastener, one being the torque at that particular position of the fastener and one, delayed by sample and hold circuits 52, 54, 56 and 58, being the torque at a previous position of the fastener. Thus, the output of comparator 66 represents the change in the torque signal over a fixed increment of rotation of the fastener. The gradient signal from gradient comparator 66 is fed to a suitable signal amplifier 68 which amplifies the gradient signal to a magnitude compatible with the rest of the system.

From the foregoing, it is seen that the gradient signal is developed by comparing the torques being applied to the fastener at different times to develop indications of the changes in torque over fixed increments of rotation imparted to the fastener. By selecting the appropriate division to be made in chord length divider 62, it is possible to adjust the chord length over which the gradient is being calculated. In this way, the apparatus may be adjusted to distinguish between actual torque changes and electrical and mechanical noise.

The output of signal amplifier 68 is supplied simultaneously to a comparator 70 and a sample and hold circuit 72 which is clocked by signals from proximity probe 44. Comparator 70 also may be in the form of a conventional differential amplifier which subtracts its two inputs. The combination of comparator 70 and sample and hold circuit 72 serves to develop a gate signal at the onset of the substantially linear tightening portion of the torque-rotation curve. In particular, the two inputs to comparator 70 are samples of the gradient signal taken at different rotational positions of the fastener, one being the gradient at that particular position of the fastener and one, delayed by sample and hold circuit 72, being the gradient at a previous position of the fastener. Thus, the output of comparator 70 represents the change in the gradient signal over a fixed increment of rotation of the fastener. When operating in the substantially linear tightening portion of curve $T_A$, the gradient signal ($dT_A/d\theta$) is substantially constant. Therefore, if the two angle displaced gradient signal inputs to the comparator are the same, the subtraction operation performed by the comparator yields a zero and the onset of the substantially linear tightening portion is sensed. Comparator 70 is conditioned to provide a distinct output signal when this occurs.

As stated previously, the tightening curves shown in FIG. 1 are idealized representations of what actually occurs under practical conditions. In order to sense the onset of a substantially linear tightening portion rather than a truly linear tightening portion, comparator 70 may be conditioned to provide a gate signal when the change in the two gradient inputs to the comparator is less than a prescribed amount. In other words, if the gradient signal supplied to comparator 70 directly from signal amplifier 68 differs from the delayed gradient signal supplied to comparator 70 through sample and hold circuit 72 by less than a preset amount, the comparator is effective to sense the onset of a substantially linear gradient. Such a modification may be built into comparator 70 or yet another comparator 73 may be provided at the output of compartor 70. The gate signal developed by comparator 70 is compared against a reference established by a linearity set circuit 75 and when the gate signal is equal to or less than the reference, comparator 73 passes the gate signal through. Linearity set circuit 75 may be in the form of a suitable potentiometer.

Also included in the tightening apparatus are means for determining the tightening torque defined by Equation (12). This torque represents the torque level which is to be imparted to the threaded fastener to achieve the desired preload $P_D$. Specifically, the outputs of memory system 30, which carry the signals representative of $P_D$ and $P_L$, are supplied to a subtractor 74, the output of which, in turn, is supplied to a divider 76 along with the output from memory system 30 which carries the signal representative of the tension rate of the assembly. Subtractor 74 and divider 76 also may be of conventional construction and operation. The output of divider 76 is supplied to a multiplier 78 along with the output from signal amplifier 68 which carries the signal representative of the gradient of the torque-rotation curve $T_A$. Multiplier 78 also may be of conventional construction and operation. The output of multiplier 78 is a signal representative of the first torque component of Equation (12).

The second torque component of Equation (12), namely the torque imparted to the threaded fastener at the onset of the substantially linear tightening portion of the torque-rotation curve $T_A$, is developed directly from the output of torque amplifier 50. In particular, the torque signal from torque amplifier 50 is supplied to a gate circuit 80 which is conditioned initially to prevent passage of the torque signal. However, when the gate signal from comparator 70 is developed at the onset of the substantially linar tightening portion of torque-rotation curve $T_A$, the torque signal at that time is passed by gate circuit 80 to an adder 82 where this torque level is stored and added to the output from multiplier 78. Adder 82 may be of conventional construction and operation. The output from adder 82 is a signal representative of the tightening torque defined by Equation (12).

The tightening apparatus of FIG. 2 also includes comparison means responsive to the torque signal from torque amplifier 50 and the tightening torque signal developed by adder 82 for comparing the torque imparted to the threaded fastener with the tightening torque developed by adder 82 and for developing a control signal when the two are equal. The two torque signals are supplied to a comparator 84 which develops the control signal when the two signals are equal. So long as there is a difference between the two inputs to comparator 84, the comparator develops an output signal representative of this difference. When the two inputs to comparator 84 are the same, namely after the torque level imparted to the threaded fastener is equal to the tightening torque represented by the output signal from adder 82, comparator 84 develops a control signal. Comparator 84 is conditioned to provide a distinct output signal when the two inputs to the comparator are equal.

The tightening apparatus further includes control means for supplying the control signal to the driving means to stop the driving means from imparting torque and rotation to the fastener. The control means include a valve drive circuit 88 which serves to supply the control signal, developed by comparator 84, to solenoid valve 14 to shut down the drive of wrench 10. While comparator 84 develops an output signal representative of the difference between the two inputs to the comparator, the output signal is supplied to valve drive circuit 88 which, in turn, controls solenoid valve 14 to drive wrench 10. When comparator 84 develops the control signal, valve drive circuit 88 senses this distinct output signal and causes solenoid valve 14 to shut down the drive of wrench 10. Valve drive circuit 84 may be in the form of a suitable amplifier which amplifies the control signal to a level sufficient to cause solenoid valve 14 to shut down the drive of wrench 10.

To assure that the output from comparator 84 does not inadvertently shut down the drive of wrench 10 during the non-linear tightening portion of the torque-rotation curve, gate circuit 80 receives an additional input signal from a gradient comparator 90. Instantaneous gradient signals are fed from signal amplifier 68 to gradient comparator 90 which also receives an input signal from a gradient set circuit 92. This circuit may be in the form of a suitable potentiometer. The gradient set level is selected by considering the gradient level at which the onset of the substantially linear tightening portion is estimated and the preload which is to be induced into the fastener when the assembly has been tightened to the desired degree. When the level of the instantaneous gradient from signal amplifier 68 exceeds the level set by gradient set circuit 92, gradient comparator 90 provides a signal to gate circuit 80 which allows the torque signal from torque amplifier 50 to be supplied to adder 82. With adder 82 conditioned to inhibit the development of an output signal until such time that an input to the adder is supplied from gate circuit 80, the drive of wrench 10 will not be shut down prematurely.

A reset switch 94 is provided to clear the circuits and prepare the tightening apparatus for a new tightening operation with another fastener.

Certain possible modifications to the FIG. 2 apparatus should be noted. Instead of providing separate inputs representative of the desired preload which is to be induced in the fastener and the preload at the onset of the substantially linear tightening portion, a single output, representative of the difference between these two preloads, may be supplied. This is possible since both of these preloads are known in advance and the subtraction operation performed by subtractor 74 may be performed manually. In such a case, subtractor 74 may be removed from the apparatus.

Also, because the tension rate is known in advance of the tightening operation, the division of the difference in preloads by the tension rate may be done manually. Under such circumstances, divider 76 may be removed and a signal representative of the difference in preloads divided by the tension rate would be supplied directly to multiplier 78 along with the signal representative of the gradient of the torque-rotation curve.

Figure 3:
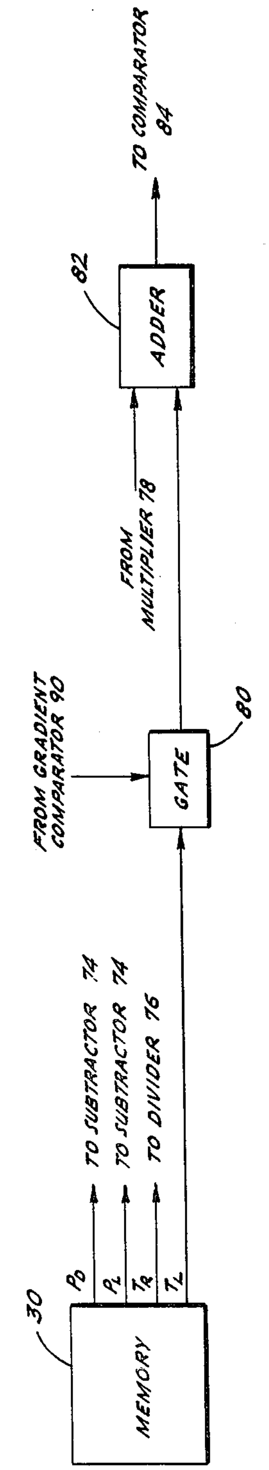
FIG. 3 shows a modification to the FIG. 2 apparatus.

FIG. 3 illustrates a modification which may be made to the FIG. 2 tightening apparatus. Instead of selecting a preload $P_L$ at the onset of the substantially linear tightening portion and deriving torque $T_L$ by sampling the applied torque at the onset of the substantially linear tightening portion, the modification shown in FIG. 3 contemplates selection of a preload $P_L$ after the onset of the substantially linear tightening portion and a determination in advance of tightening of the torque $T_L$ which induces preload $P_L$. In such a case, torque $T_L$ may be derived by taking the average of a plurality of test tightenings which induce preload $P_L$. It should be pointed out that use of an average torque $T_L$ determined prior to the actual tightening cycle may result in small errors in the final desired tightening torque $T_F$ due to friction variations between the test joints and the actual joint being tightened. However, these errors are considered to be within acceptable limits compared to other tightening techniques and the magnitude of these errors is reduced as torque $T_L$ and preload $P_L$ approach the torque and preload at the onset of the substantially linear tightening portions of the torque-rotation and preload-rotation curves, respectively.

Establishing torque $T_L$ in advance of tightening and storing this torque value in memory 30 eliminates from the FIG. 2 apparatus comparator 70, sample and hold circuit 72, comparator 73 and linearity set circuit 75. These circuit components serve in the FIG. 2 system to identify the onset of the substantially linear tightening portion and develop the gate signal for sampling the applied torque at the onset of the substantially linear tightening portion. Instead, in FIG. 3, the predetermined torque $T_L$ is supplied from memory 30 through gate 80 to adder 82 as the second torque component of Equation (12). In all other respects, the FIG. 2 system operates as previously described.

While in the foregoing there have been described preferred embodiments of the invention, it should be understood to those skilled in the art that various modifications and changes can be made without departing from the true spirit and scope of the invention as recited in the claims.

I claim:

1. Apparatus for tightening an assembly including a threaded fastener comprising:

driving means for imparting torque and rotation to said fastener to tighten said assembly, the torque-rotation curve and the preload-rotation curve for said assembly each having a substantially linear tightening portion;

means for supplying (1) a preload signal representative of the difference between a desired preload which is to be induced in said fastener when said assembly has been tightened to a desired degree and a selected preload within said substantially linear tightening portion of said preload-rotation curve and (2) a tension rate signal representative of the tension rate of said assembly;

torque sensing means responsive to said driving means for developing a first torque signal representative of the torque imparted to said fastener;

angle sensing means responsive to said driving means for developing an angle signal representative of the rotation imparted to said fastener;

gradient calculating means responsive to said first torque signal and said angle signal for developing a gradient signal representative of the gradient of said torque-rotation curve;

means responsive to said preload signal, said tension rate signal and said gradient signal for developing a second torque signal representative of the product of said preload difference and said gradient divided by said tension rate;

means for supplying a third torque signal representative of the torque which induces said selected preload;

means responsive to said second torque signal and said third torque signal for developing a fourth torque signal representative of a tightening torque equal to the sum of the torques represented by said second torque signal and said third torque signal;

comparison means responsive to said first torque signal and said fourth torque signal for comparing said torque imparted to said fastener with said tightening torque and for developing a control signal when said torque imparted to said fastener is equal to said tightening torque;

and control means for supplying said control signal to said driving means to stop said driving means from imparting torque and rotation to said fastener.

2. Apparatus for tightening an assembly including a threaded fastener comprising:

driving means for imparting torque and rotation to said fastener to tighten said assembly, the torque-rotation curve and the preload-rotation curve for said assembly each having a substantially linear tightening portion;

memory means for storing (1) a first preload signal representative of a desired preload which is to be induced in said fastener when said assembly has been tightened to a desired degree, (2) a second preload signal representative of a selected preload within said substantially linear tightening portion of said preload-rotation curve, and (3) a tension rate signal representative of the tension rate of said assembly;

torque sensing means responsive to said driving means for developing a first torque signal representative of the torque imparted to said fastener;

angle sensing means responsive to said driving means for developing an angle signal representative of the rotation imparted to said fastener;

gradient calculating means responsive to said first torque signal and said angle signal for developing a gradient signal representative of the gradient of said torque-rotation curve and having a substantially constant value during said substantially linear tightening portion;

means responsive to said stored preload signals, said stored tension rate signal and said gradient signal for developing a second torque signal representative of the product of the difference between said preloads and said gradient divided by said tension rate;

means for supplying a third torque signal representative of the torque which induces said selected preload;

means responsive to said second torque signal and said third torque signal for developing a fourth torque signal representative of a tightening torque equal to the sum of the torques represented by said second torque signal and said third torque signal;

comparison means responsive to said first torque signal and said fourth torque signal for comparing said torque imparted to said fastener with said tightening torque and for developing a control signal when said torque imparted to said fastener is equal to said tightening torque;

and control means for supplying said control signal to said driving means to stop said driving means from imparting torque and rotation to said fastener.

3. Apparatus for tightening an assembly including a threaded fastener comprising:

driving means for imparting torque and rotation to said fastener to tighten said assembly, the torque-rotation curve and the preload-rotation curve for said assembly each having a substantially linear tightening portion;

memory means for storing (1) a first preload signal representative of a desired preload which is to be induced in said fastener when said assembly has been tightened to a desired degree, (2) a second preload signal representative of the preload at the onset of said substantially linear tightening portion of said preload-rotation curve, and (3) a tension rate signal representative of the tension rate of said assembly;

torque sensing means responsive to said driving means for developing a first torque signal representative of the torque imparted to said fastener;

angle sensing means responsive to said driving means for developing an angle signal representative of the rotation imparted to said fastener;

gradient calculating means responsive to said first torque signal and said angle signal for developing a gradient signal representative of the gradient of said torque-rotation curve and for developing a gate signal at said onset of said substantially linear tightening portion;

means responsive to said stored preload signals, said stored tension rate signal and said gradient signal for developing a second torque signal representative of the product of the difference between said preloads and said gradient divided by said tension rate;

means responsive to said first torque signal and said gate signal for developing a third torque signal representative of the torque imparted to said fastener at said onset of said substantially linear tightening portion;

means responsive to said second torque signal and said third torque signal for developing a fourth torque signal representative of a tightening torque equal to the sum of the torques represented by said second torque signal and said third torque signal;

comparison means responsive to said first torque signal and said fourth torque signal for comparing said torque imparted to said fastener with said tightening torque and for developing a control signal when said torque imparted to said fastener is equal to said tightening torque;

and control means for supplying said control signal to said driving means to stop said driving means from imparting torque and rotation to said fastener.

4. Apparatus according to claim 3 wherein the gradient calculating means include:

first delay means responsive to the first torque signal and the angle signal for delaying said first torque signal for a predetermined rotation of the threaded fastener;

first comparison means responsive to said first torque signal and said delayed first torque signal for developing the gradient signal;

second delay means responsive to said gradient signal and said angle signal for delaying said gradient signal for a predetermined rotation of said threaded fastener;

and second comparison means responsive to said gradient signal and said delayed gradient signal for developing the gate signal.

5. Apparatus according to claim 4 wherein the second comparison means develop the gate signal when the gradient signal and the delayed gradient signal are substantially equal.

6. A method for tighting an assembly including a threaded fastener to which torque and rotation are imparted to induce a predetermined preload in the fastener when said assembly has been tightened to a desired degree, the torque-rotation curve and the preload-rotation curve for said assembly each having a substantially linear tightening portion, said method comprising the steps of:

establishing said predetermined preload;

establishing a selected preload for said fastener within said substantially linear tightening portion of said preload-rotation curve, said selected preload being smaller than said predetermined preload;

establishing the tension rate of said assembly;

imparting torque and rotation to said fastener;

calculating the gradient of said torque-rotation curve;

determining the torque which induces said selected preload in said fastener;

calculating a tightening torque equal to said torque which induces said selected preload plus the product of the difference between said preloads and said gradient divided by said tension rate;

determining when said torque imparted to said fastener is equal to said tightening torque;

and discontinuing application of torque and rotation to said fastener when said torque imparted to said fastener is equal to said tightening torque.

7. A method for tightening an assembly including a threaded fastener to which torque and rotation are imparted to induce a predetermined preload in the fastener when said assembly has been tightened to a desired degree, the torque-rotation curve and the preload-rotation for said assembly each having a substantially linear tightening portion, said method comprising the steps of:

establishing said predetermined preload;

establishing the preload for said fastener at the onset of said substantially linear tightening portion of said preload-rotation curve;

establishing the tension rate of said assembly;

imparting torque and rotation to said fastener;

calculating the gradient of said torque-rotation curve;

identifying said onset of said substantially linear tightening portion of said torque-rotation curve;

measuring the torque imparted to said fastener at said onset of said substantially linear tightening portion;

calculating a tightening torque equal to said torque imparted to said fastener at said onset of said substantially linear tightening portion of said torque-rotation curve plus the product of the difference between said preloads and said gradient divided by said tension rate;

determining when said torque imparted to said fastener is equal to said tightening torque;

and discontinuing application of torque and rotation to said fastener when said torque imparted to said fastener is equal to said tightening torque.

8. A method according to claim 7 wherein the onset of the substantially linear tightening portion is identified by sensing when the gradient is substantially constant.

9. A method according to claim 8 wherein the value of the gradient at one rotational position of the fastener is compared with the gradient at another rotational position of said fastener to determine when there is no change in the gradient.

* * * * *